Sept. 12, 1961 H. E. EIGNER ET AL 2,999,809
METHOD OF REMOVING RESIDUAL OXYGEN FROM WATER CONDITIONING SYSTEMS
Filed May 20, 1957
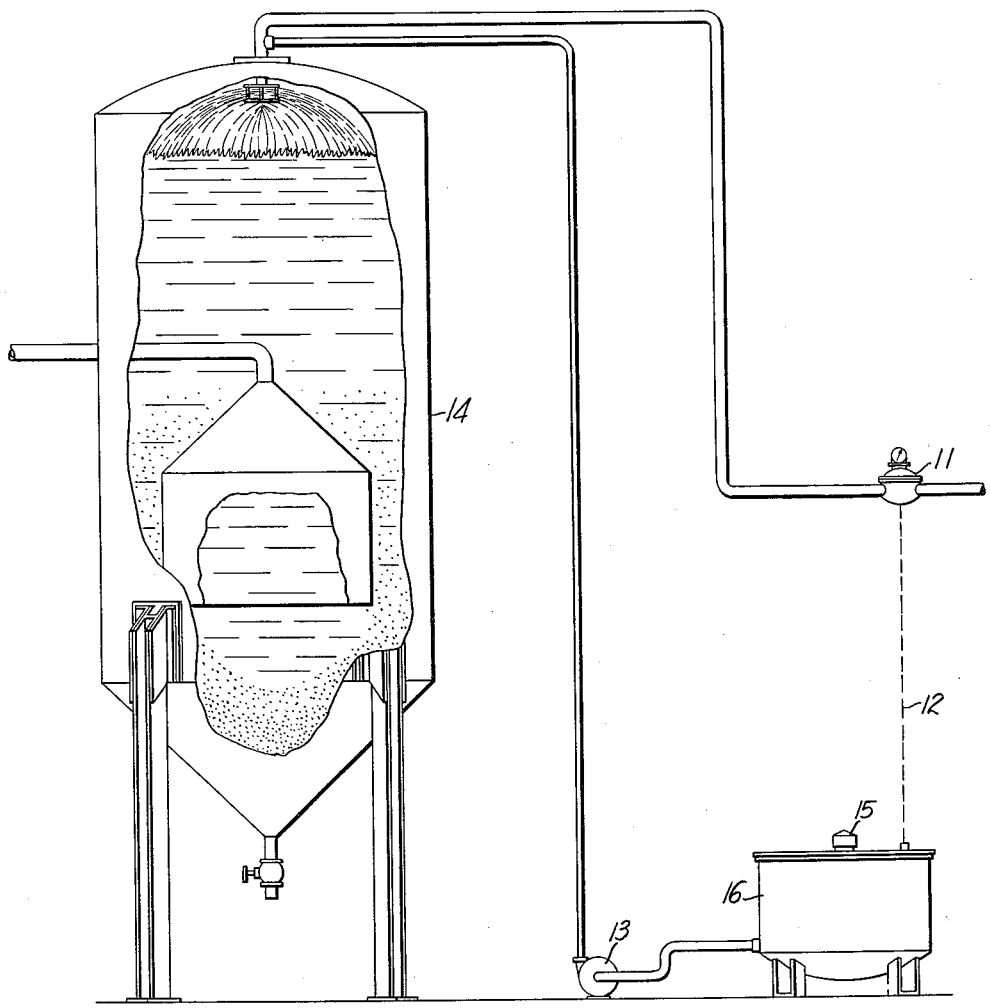
Inventors
Harold E. Eigner
Carroll E. Imhoff
by Joseph E. Kerwin
Attorney

2,999,809
METHOD OF REMOVING RESIDUAL OXYGEN FROM WATER CONDITIONING SYSTEMS

Harold E. Eigner, Milwaukee, and Carroll E. Imhoff, New Berlin, Wis., assignors to Allis-Chalmers Manufacturing Company, Milwaukee, Wis.
Filed May 20, 1957, Ser. No. 660,143
4 Claims. (Cl. 210—48)

This invention relates to the method of providing oxygen scavenging chemicals in a hot process water softening treatment. Such water treating systems may present corrosion problems because of the presence of dissolved oxygen at high temperature in water free of hardness.

It is known that the sulphites, particularly the sodium sulphites, are useful as oxygen scavengers in the treatment of water, the removal of free oxygen being desirable in order to avoid corrosion of the materials of the apparatus with which the treated water comes in contact. The teaching of the prior methods of scavenging oxygen from treated water necessitates additional feeding and proportioning equipment, additional maintenance and control of a separate feeder, or the expense of deaeration equipment and the cost of additional water deaeration. Prior methods suggest the likelihood of having to provide separate chemical feeding systems to inject sodium sulphite solution into a hot process softener or suggest providing mechanical deaeration following the hot process softener and before the water is fed to the hot zeolite softeners.

Consequently included among the problems solved by this invention are the need for extra equipment, additional floor space in the processing plant, the addition of proportioning controls and equipment, the addition of deaeration equipment and the provision of extra chemical controls.

In accordance with this invention an oxygen scavenging chemical is added to the standard chemical proportioning feeder of the hot process softener apparatus. Within the feeder there is the conventional slurry of calcium hydroxide formed from the hydrated lime in the fluid mixture. A small amount of the lime dissolves and becomes soluble in the liquid part of the mixture (about 2500 p.p.m.). This lime slurry is available for addition to the softener upon raw water demand through means of the conventional proportioning control equipment. Sodium sulphite, the oxygen scavenging chemical, is added to this slurry (ratio of sodium sulphite to lime is approximately 1:20). This results in the formation of soluble sodium hydroxide and insoluble calcium sulphite. This reaction in the chemical tank is as follows:

$$Na_2SO_3 + Ca(OH)_2 \rightarrow 2NaOH + CaSO_3$$

The calcium sulphite formed in the hot process chemical tank is substantially insoluble, or at least as relatively insoluble as it is in the chemical tank in the presence of an excess of calcium ions furnished from the lime slurry. Thus, the calcium sulphite being in effect insoluble cannot release the sulphite ion to make it available for reaction with dissolved oxygen so long as the slurry is confined to the chemical tank.

The lime slurry now containing calcium sulphite is caused by the lime slurry chemical feeder proportioning means (responsive to raw water demand) to be fed along with the other water treating chemicals of the slurry from the chemical tank to the sedimentation tank of the system, the resulting proportion of calcium ion content (in the sedimentation tank) is greatly reduced due to the dilution with the raw water. This causes the calcium sulphite to go into solution, thus freeing the sulphite ion which reacts with the dissolved oxygen. This reaction in the sedimentation tank is as follows:

$$2CaSO_3 + O_2 \rightarrow 2CaSO_4$$

The addition of sodium sulphite to the lime slurry in the chemical tank not only is important in making it possible to form calcium sulphite where it is insoluble in that tank but also makes it possible that the calcium sulphite is kept in suspension in the chemical solution of the tank by reason of the fact that the chemical tank conventionally includes an agitator. That agitator serves double duty in connection with this invention. It not only is an agitator for the lime slurry but also for the calcium sulphite. Further, the oxygen scavenger, by being added as sodium sulphite to the lime feeder, not only prevents the sulphite reacting with available oxygen but effectively utilizes the lime feeder for an additional result, that is, for porportioning the feeding of the sulphite with no additional equipment in proportion to the demand of the water flow.

It is to be further noted that the proportioning of the lime slurry involved in this invention into the sedimentation tank preferably provides a diluted lime concentration of about 100 p.p.m. This concentration, being below the solubility concentration of calcium hydroxide causes the calcium hydroxide to dissolve in the water of the sedimentation tank and react immediately with calcium bicarbonate which comprises part of the hardness of the water, to produce a calcium carbonate sludge according to the equation:

$$Ca(OH)_2 + Ca(HCO_3)_2 \rightarrow 2CaCO_3 + 2H_2O$$

The soluble sodium hydroxide, formed in the chemical tank when the sodium sulphite was added thereto, is also fed into the sedimentation tank in the lime slurry and reacts in the sedimentation tank with calcium bicarbonate of the raw water to form sodium carbonate and some calcium carbonate sludge, according to the equation:

$$2NaOH + Ca(HCO_3)_2 \rightarrow Na_2CO_3 + CaCO_3 + H_2O$$

The sodium carbonate thus formed then reacts with the calcium sulphate, formed by oxidation of the calcium sulphite, to result in the formation of the sodium sulphate and more calcium carbonate sludge, according to the formula:

$$Na_2CO_3 + CaSO_4 \rightarrow Na_2SO_4 + CaCO_3$$

The drawing illustrates a typical hot process softener in which water contains impurities, for example, calcium bicarbonate and magnesium bicarbonate, sulphate, chloride and nitrate, and is acted upon by a lime slurry to precipitate a sludge. Lime slurry is fed to the softener in proportion to the amount of water added to the system, and this is accomplished by a flow meter means 11 including means 12 for transmitting an electrical impulse as a certain amount of water passes through the meter. Various types of systems have been suggested in the art relating to hot process water softeners for effecting this control in response to water flow. Fluid motion is effected by a pump 13 which feeds a proportional amount of lime slurry to the sedimentation tank 14 of the softener. The illustration includes a symbolic representation of an agitator 15 that is conventionally included in the chemical tank 16. The lime slurry containing the sulphite is added to the sedimentation tank along with the raw water at the top of the sedimentation tank.

Although but a single method of the present invention has been illustrated and described, it will be apparent to those skilled in the art that various changes and modifications may be made therein without departing from the spirit of the invention or the scope of the appended claims.

What is claimed is:

1. In a hot process water softening system having a sedimentation tank connected via independent conduit means respectively to a chemical lime feeder tank and to a raw water supply, and control means responsive to the flow of fluids through said conduit means into mixed relationship in said sedimentation tank to maintain a preselected volume ratio therebetween, an improved method of removing dissolved oxygen from a raw water-chemical-lime mixture in the sedimentation tank comprising: introducing hydrated lime slurry containing calcium hydroxide to the chemical lime feeder tank; admixing sufficient sodium sulphite with said slurry in said feeder tank to provide an admixture having a sodium sulphite to lime ratio of approximately 1 to 20 and insoluble calcium sulphite; establishing a flow of raw water, containing dissolved oxygen therein, into the sedimentation tank; establishing a flow of said admixture into the sedimentation tank while maintaining said calcium sulphite insoluble and unreactive with oxygen; and proportioning said flows to solubilize said calcium sulphite therefrom for reaction with said dissolved oxygen in said water whereby water free of dissolved oxygen and calcium sulphate are formed.

2. In a hot process water softening system having a sedimentation tank with first fluid conduit means supplying a first flow thereto from a chemical lime feeder tank and second fluid conduit means supplying a second flow thereto from a raw water supply, and proportioning means controlling the flow from the feeder tank and the flow from the raw water supply into the sedimentation tank to provide a preselected mixture therein, the method of removing dissolved oxygen therefrom comprising: supplying the lime feeder tank and the raw water supply with lime slurry and raw water containing dissolved oxygen, respectively; admixing an amount of sodium sulphite with the lime slurry in the lime feeder tank sufficient, by chemical reaction therewith, to form insoluble calcium sulphite and soluble sodium hydroxide while maintaining an excess of calcium ions therein; and feeding said reacted slurry and said raw water into a sedimentation tank, said water being of sufficient volume to depress the concentration of said excess of calcium ions in said reacted slurry beneath a calcium sulphite solubility inhibiting level whereupon said calcium sulphite becomes solubilized and reactive with said dissolved oxygen in said raw water and removes said oxygen therefrom.

3. In a hot process water softening system including a chemical tank, a raw water supply, and a sedimentation tank, the chemical tank and the raw water supply each being independently connected with the sedimentation tank to supply reactants thereto, the method of removing dissolved oxygen from water treated therein comprising: forming, in the chemical tank, a lime slurry consisting substantially of saturated calcium hydroxide; adding to said slurry sufficient sodium sulphite to form sodium hydroxide, calcium sulphite and an excess of calcium ions, said calcium sulphite being insoluble and unreactive with oxygen; agitating said slurry in the chemical tank to maintain said insoluble calcium sulphite in suspension with the slurry solution; feeding said slurry including said sodium hydroxide and said suspended calcium sulphite into the sedimentation tank of the hot process water softening system at a rate proportionate to the flow of raw water into the sedimentation tank; feeding to the sedimentation tank raw water, containing dissolved oxygen and calcium bicarbonate, at a rate to dilute the calcium ion concentration whereupon said calcium sulphite solubilizes to remove dissolved oxygen from said raw water.

4. A process for removing dissolved oxygen from water being treated in the sedimentation tank of a hot process water softening system comprising: preparing a constituent fluid by admixing sodium sulphite with a lime slurry solution in a chemical tank, said constituent fluid containing calcium sulphite in the presence of a sufficient excess of calcium ions to render said calcium sulphite substantially insolube and unreactive with oxygen; and feeding the constituent fluid into the sedimentation tank simultaneously with a proportionate flow of raw water so that the concentration of calcium ions is decreased sufficiently to render said calcium sulphite soluble and reactive with oxygen dissolved in said raw water whereupon said oxygen is removed from said water.

References Cited in the file of this patent

UNITED STATES PATENTS

| | | |
|---|---|---|
| 1,117,831 | Gans | Nov. 17, 1914 |
| 1,470,084 | Knowland | Oct. 9, 1923 |

OTHER REFERENCES

"Water Conditioning Handbook," pub. by Permutit Co., New York, 4th printing (1954), pages 15/11 to 15/17, 22/20 to 22/25 and 22/37–22/40 relied upon.